(12) United States Patent
Cepeda Lopez et al.

(10) Patent No.: US 9,025,618 B2
(45) Date of Patent: May 5, 2015

(54) METHOD AND APPARATUS FOR ANTENNA SELECTION IN WIRELESS COMMUNICATIONS SYSTEMS

(75) Inventors: Rafael Arcangel Cepeda Lopez, Bristol (GB); Justin Coon, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 233 days.

(21) Appl. No.: 13/478,590

(22) Filed: May 23, 2012

(65) Prior Publication Data

US 2012/0300717 A1 Nov. 29, 2012

(30) Foreign Application Priority Data

May 24, 2011 (GB) .................................. 1108776.4

(51) Int. Cl.
*H04J 3/00* (2006.01)
*H04B 7/06* (2006.01)
*H04L 5/00* (2006.01)

(52) U.S. Cl.
CPC ............ *H04B 7/0691* (2013.01); *H04L 5/0023* (2013.01); *H04L 5/006* (2013.01)

(58) Field of Classification Search
USPC .................. 370/310–349, 464, 468, 479–482
See application file for complete search history.

(56) References Cited

U.S. PATENT DOCUMENTS

| | | | |
|---|---|---|---|
| 6,922,445 B1 * | 7/2005 | Sampath et al. | 375/267 |
| 7,085,223 B2 * | 8/2006 | Izumi | 370/204 |
| 2003/0181211 A1 * | 9/2003 | Razavilar et al. | 455/450 |
| 2004/0063412 A1 * | 4/2004 | Kim et al. | 455/226.2 |
| 2009/0274059 A1 * | 11/2009 | Xing et al. | 370/252 |

FOREIGN PATENT DOCUMENTS

JP 2005-151567 A 6/2005

OTHER PUBLICATIONS

Combined United Kingdom Search Report and Examination Report Issued Aug. 25, 2011 in Patent Application No. GB1108776.4.
Japanese Office Action Issued Jun. 4, 2013 in Patent Application No. 2012-118598 (with English translation).

* cited by examiner

*Primary Examiner* — Kwang B Yao
*Assistant Examiner* — Juvena Loo
(74) *Attorney, Agent, or Firm* — Oblon, McClelland, Maier & Neustadt, L.L.P.

(57) ABSTRACT

According to one embodiment there is provided a wireless communication device comprising a plurality of antennas and operable to transmit data on a plurality of subcarriers from one or more of said plurality of antennas over a communication channel, the device comprising a receiver configured to receive signals via each of said plurality of antennas, a processor configured to determine the number of subcarriers that can be allocated to one or more of said plurality of antennas for data transmission on the basis of received signal metrics associated with said received signals, and an antenna selector configured to select one or more of said plurality of antennas for transmitting data on said plurality of subcarriers based on said determination.

11 Claims, 7 Drawing Sheets

METHOD AND APPARATUS FOR ANTENNA SELECTION IN WIRELESS COMMUNICATIONS SYSTEMS

FIELD

Embodiments described herein relate generally to antenna selection in wireless communications systems transmitting frequency multiplexed signals.

BACKGROUND

Antenna selection in orthogonal frequency division multiplexing (OFDM) systems is a powerful technique for exploiting spatial diversity using multiple antennas at a transmitter and/or receiver. Typically, the selection of transmit antennas is performed after the received signals have been digitalised and transformed into a frequency domain using a fast Fourier transform (FFT) module. One of the disadvantages of using this approach is the latency of the process when the antenna selection is being performed. Furthermore, analogue to digital (A/D) converters, decoding modules and RF chains in a transceiver are required to remain powered on at all times, which leads to unnecessary energy wastage.

DESCRIPTION OF THE DRAWINGS

Embodiments will now be described with reference to the accompanying drawings, in which.

DETAILED DESCRIPTION

Specific embodiments will be described in further detail in the following paragraphs on the basis of the attached figures. It will be appreciated that this is by way of example only, and should not be viewed as presenting any limitation on the scope of protection sought.

Antenna selection method in OFDM can be considered to fall into two categories: (1) bulk selection, whereby one or more antennas out of a total available set are used for transmission and/or reception for all frequencies, and (2) per-subcarrier selection, which provides an additional degree of freedom that allows the antenna selection to differ across the utilised bandwidth. Both techniques have advantages and disadvantages. For example, bulk selection requires very little channel state information (CSI) feedback and exploits fewer radio frequency (RF) chains then per-subcarrier selection. However, per-subcarrier selection is capable of achieving much higher coding gains than bulk selection, i.e., the bit-error rate (BER) for per-subcarrier selection is significantly lower than for bulk selection.

Figure 1:
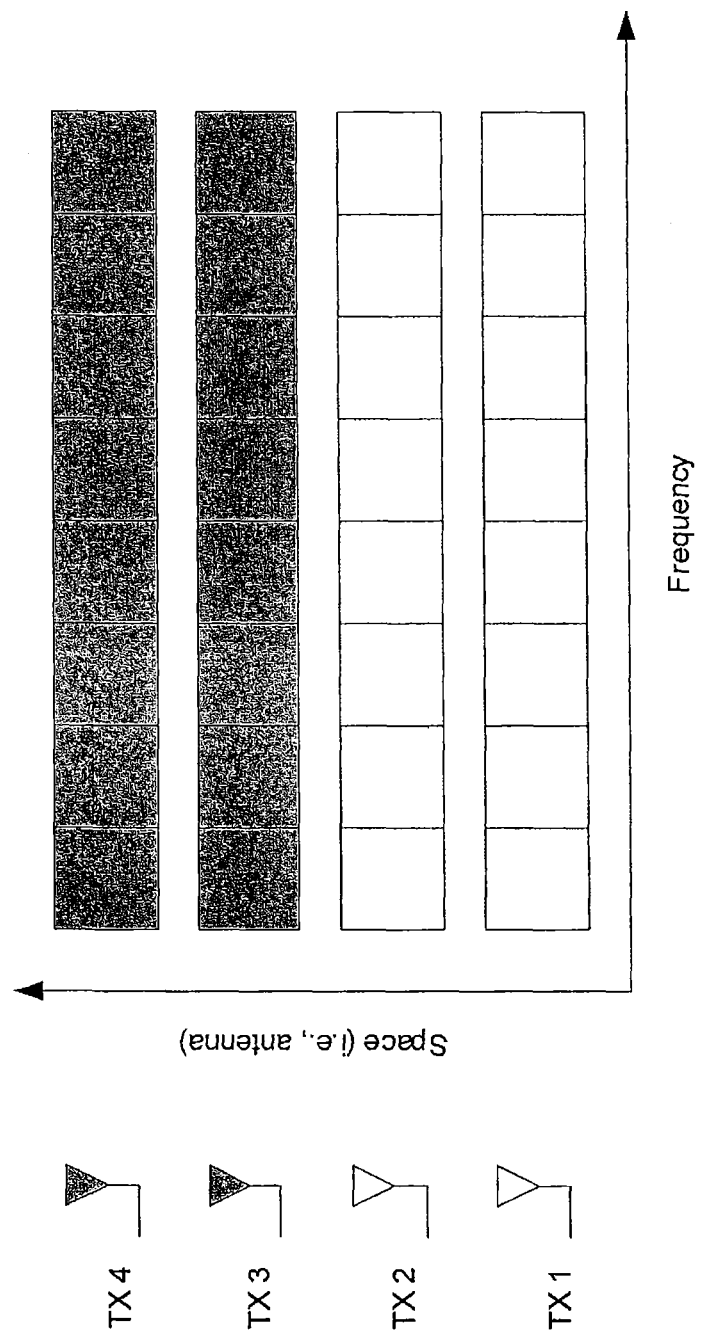
FIG. 1 illustrates the concept of bulk antenna selection.
Figure 2:
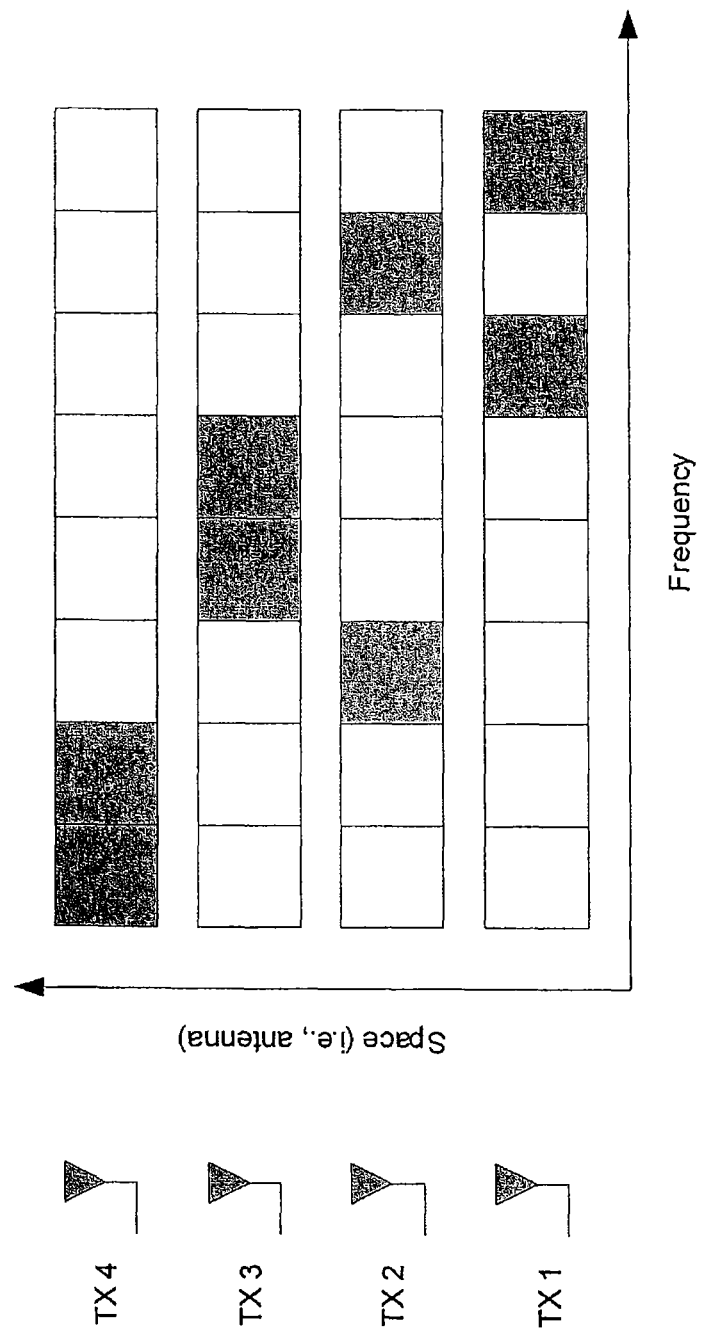
FIG. 2 illustrates the concept of per-tone antenna selection.

These two techniques are illustrated for transmit antenna selection diagrammatically in FIG. 1 and FIG. 2. In FIGS. 1 and 2 each illustrated segment represents a subcarrier, with a row of contiguous segments/subcarriers indicating the sub carriers associated with the particular antenna shown next to it. The shading denotes spatial/spectral regions that are used for transmission on the associated antenna. Blank areas indicate sub carriers that are not used for transmission on the associated antenna.

In FIG. 1 transmitters TX 3 and TX 4 both transmit on all frequencies. Thus, only two RF chains are required for this scenario. In contrast, FIG. 2 shows all transmitters conveying information; however, only one transmitter is active on any given subcarrier. This is the so-called per-subcarrier antenna selection approach, which requires four RF chains. Note that both these selection schemes can equally be performed at the receiver instead of the transmitter, or indeed at both the transmitter and the receiver. Per-subcarrier selection has been shown to perform exceptionally well. However, its implementation requires a large number of RF circuitry, which can draw a considerable amount of system resources (e.g., power) and reduce battery life in portable devices.

In the most general case, antenna selection can be performed such that a single antenna is chosen for transmission out of M available antenna, or a subset of L antenna are chosen out of M available antenna. The former approach is herein labelled "single-antenna selection", while the latter is termed "subset selection". Both approaches can be employed in bulk selection or per-subcarrier selection scenarios.

Figure 3:
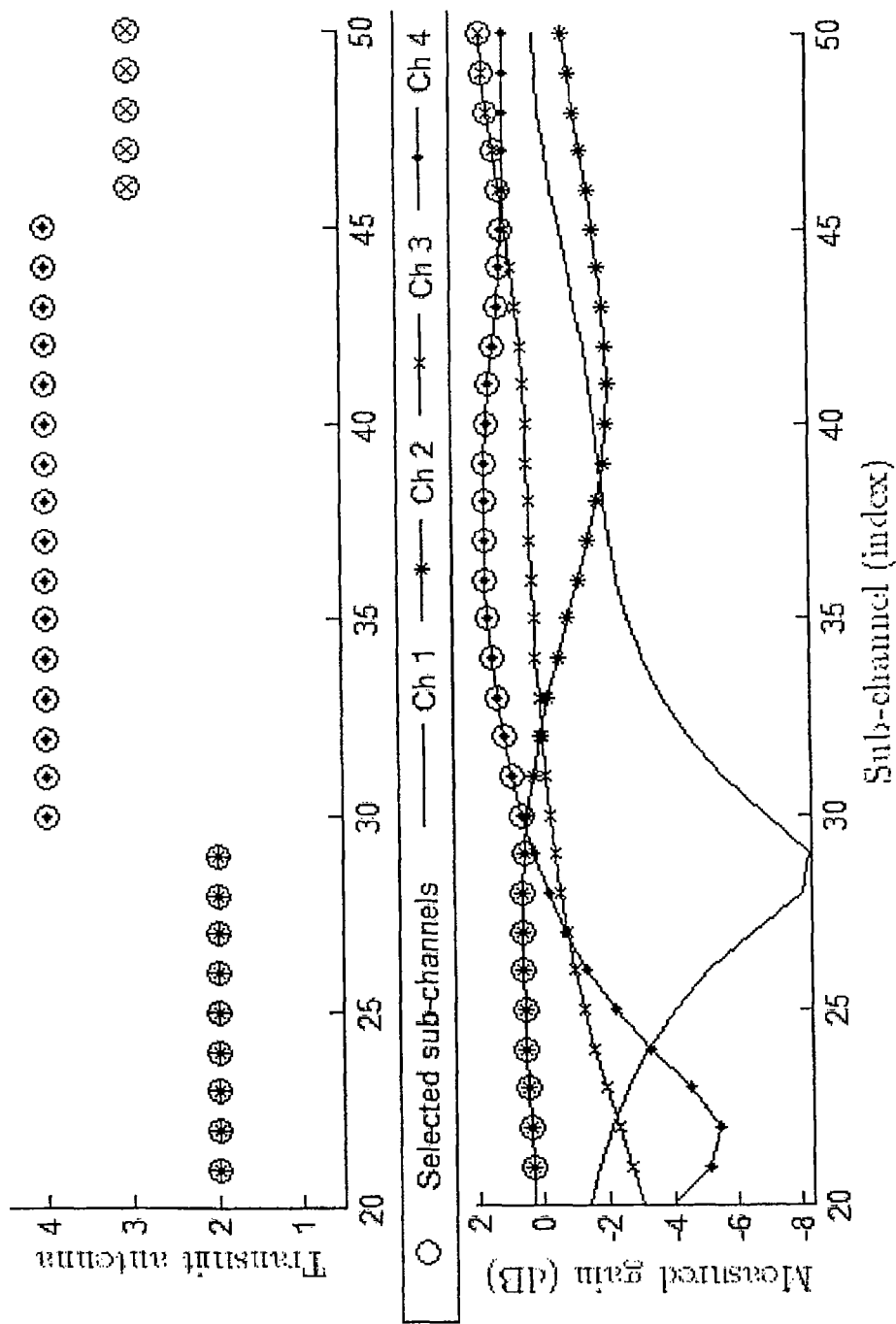
FIG. 3 illustrates the selection of transmit antennas based on a measured gain of each antenna in each of the subcarriers.

If channel information is available at a transmitter, one method of selecting the best antennas for transmission is by measuring the gain of each antenna and selecting the antenna that provides the best gain at each subcarrier for data transmission. An example of this method is illustrated in FIG. 3. The lower graph in FIG. 3 illustrates the measured antenna gain at each of the antennas of a four-antenna transmitter over a group of subcarriers. The x-axis in that graph represents a group of subcarriers (20 to 50) in an OFDM symbol while the y-axis represents the measured antenna gain at each of the antennas over the group of sucarriers. The circle in the graph denotes antennas that have been selected for transmission over the subcarriers. As illustrated in the upper graph in FIG. 3, transmit antennas TX 2, TX 3, and TX 4 have been selected for transmission over subcarriers 21-29, 30-45, and 46-50 respectively. In this example, transmit antenna, TX 1, which experiences low gains over the subcarriers, has not been selected for transmission.

According to one embodiment there is provided a wireless communication device comprising a plurality of antennas and operable to transmit data on a plurality of subcarriers from one or more of said plurality of antennas over a communication channel, the device comprising a receiver configured to receive signals via each of said plurality of antennas, a processor configured to determine the number of subcarriers that can be allocated to one or more of said plurality of antennas for data transmission on the basis of received signal metrics associated with said received signals; and an antenna selector configured to select one or more of said plurality of antennas for transmitting data on said plurality of subcarriers based on said determination.

The received signal metrics may include any one of the following:
total received energy of said received signals;
peak received power of said received signals; and
root mean square (RMS) delay spread of said received signals.

The processor may be further configured to determine the number of subcarriers that can be allocated to one or more of said plurality of antennas for data transmission on the basis of a function defining a relationship between said received signal metrics and subcarriers that can be allocated to said one or more of said plurality of antennas.

The function may include a linear regression defining said relationship, and is expressible in the form:

$$y = \alpha + \beta x$$

where α is the intersection point and β is the slope factor.

The processor may be configured to determine the number of subcarriers that can be allocated to each of said plurality of antennas for data transmission The processor may be further configured to arrange said plurality of antennas in descending order by the number of subcarriers that can be allocated to each of said plurality of antennas.

The antenna selector may be configured to select a set of antennas from said arranged antennas, such that the total number subcarriers allocated to said set of antennas is equal to or greater than said plurality of subcarriers.

In one embodiment, the wireless communication device may further comprise radio frequency (RF) modules connected to each of said plurality of antennas, and said processor is operable to switch off said RF modules corresponding to antennas other than said selected antennas.

According to another embodiment, there is provided a method of operating a wireless communication device comprising a plurality of antennas and operable to transmit data on a plurality of subcarriers from one or more of said plurality of antennas over a communication channel, the method comprising receiving signals via each of said plurality of antennas, determining the number of subcarriers that can be allocated to one or more of said plurality of antennas for data transmission on the basis of received signal metrics associated with said received signals, and selecting one or more of said plurality of antennas for transmitting data over said plurality of subcarriers based on said determination.

One embodiment provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configure by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

Figure 4:
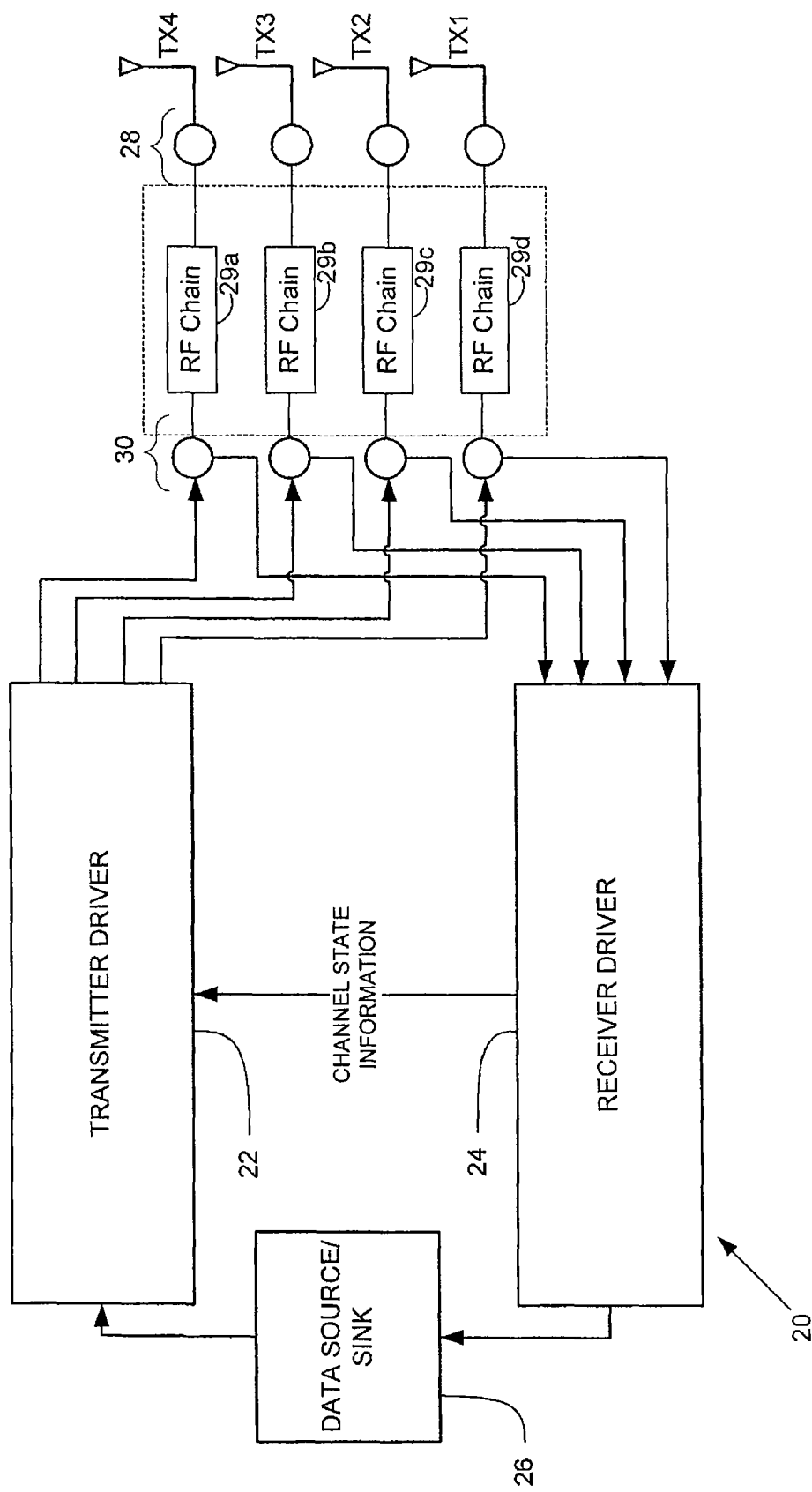
FIG. 4 is a simplified schematic illustration of a transceiver device according to an embodiment.

FIG. 4 illustrates a schematic transceiver device 20 comprising a transmitter driver 22 operable to receive data from data sink/source 26 for transmission on the antennas TX 1 to TX 4 via the respective RF chains 29a to 29d of the device 20. A receiver driver 24 receives and processes signals received on the same antennas, and provides data to the data source/sink 26 and channel state information to the transmitter driver 22. An array of switches 28 is provided to allow the antennas to be selected for both transmitting and receiving. As shown in FIG. 4, the RF chains 29a, 29b, 29c, and 29d are connected to the switches 28. An array of switches 30 is also provided between the RF chains and the transmitter and receiver drivers to enable the device to select the RF chains to be used for both transmitting and receiving.

Figure 5:
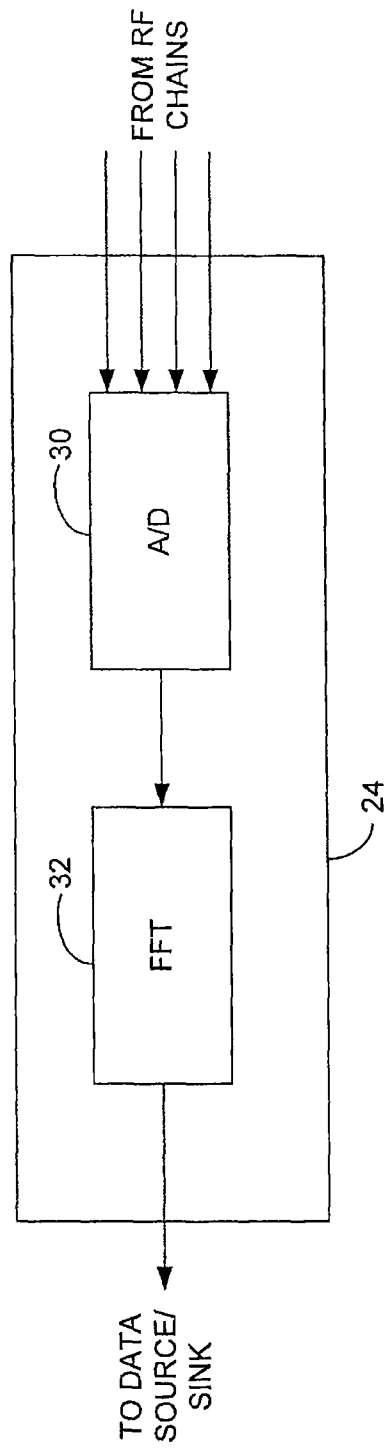
FIG. 5 is a schematic diagram of a receiver driver illustrated in FIG. 4.

FIG. 5 shows a simplified illustration of the receiver driver 24 of the transceiver device 20. As shown in FIG. 5, the receiver driver 24 includes an analogue to digital converter (ND) module 30 and a fast Fourier transform (FFT) module 32. The A/D converter 30 transforms the received analogue signals into digital samples which are then converted into its frequency domain using the FFT module. Subsequently, further modules (not shown) are used for post-processing of the decoded data as in any other OFDM system. The post-processed data are used to determine which of the antennas are to be used for data transmission. In such a configuration, the number of RF chains, ND modules, and FFT modules need to be equivalent to the number of antennas.

It is noted that a number of advantages can be achieved if the antenna selection is performed in the time domain, i.e. before the received signals are converted into digital frequency domain. Hence, an embodiment described herein provides a method of performing antenna selection based on analogue signals in the time domain.

Figure 6:
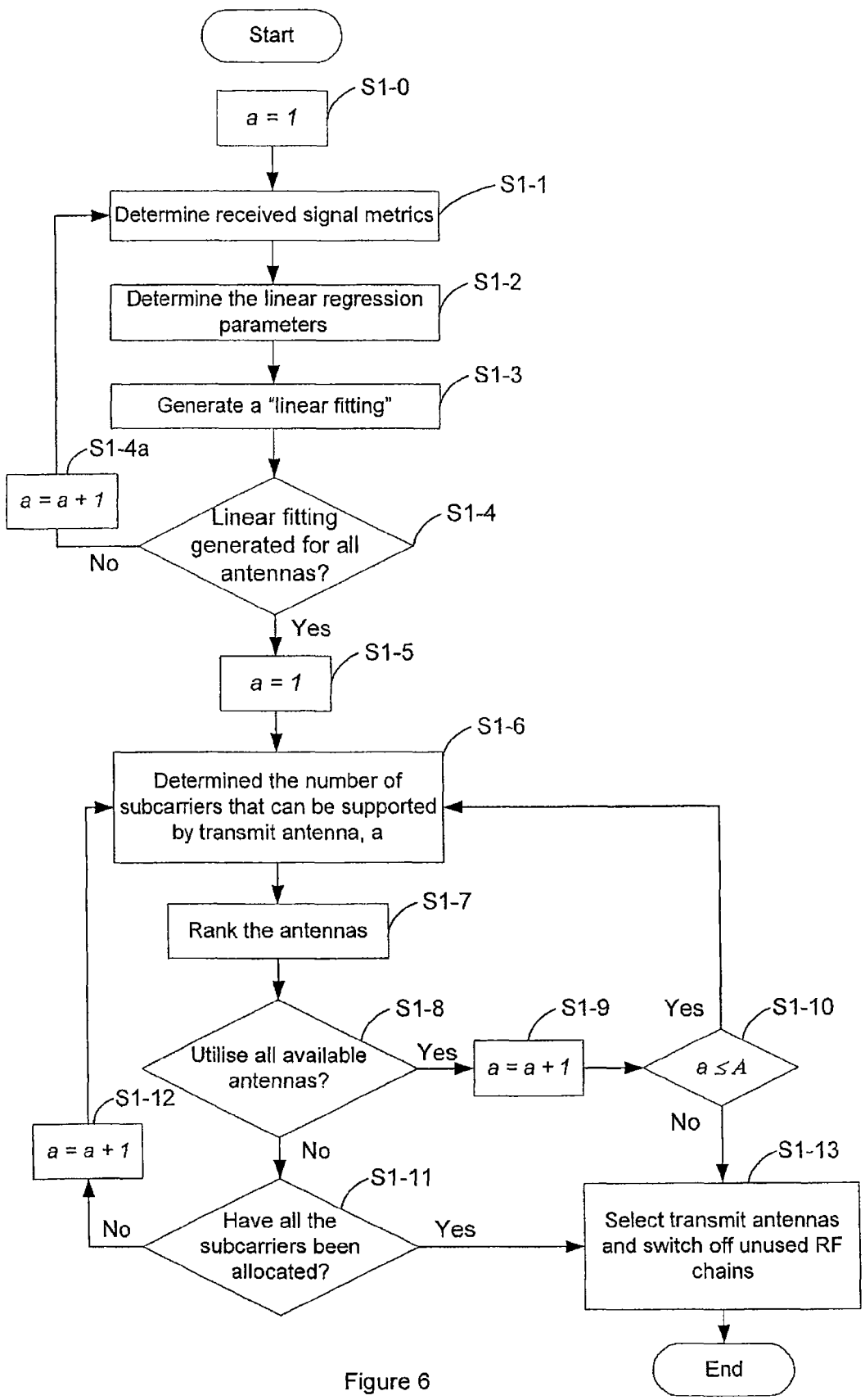
FIG. 6 shows a flow diagram of an antenna selection procedure according to an embodiment.

FIG. 6 illustrates the process of selecting transmit antennas according to an embodiment. The transceiver device 20 performs antenna selection according to the following procedure:

Step S1-0: Initialise the transmit antenna index, α=1.

Step S1-1: Determine received signal metrics from the received analogue signals. Examples of the received signal metrics include total received energy, peak received power, root mean square (RMS) delay spread and so on. In this example, the total received energy is used to determine the received signal metrics. Alternatively, a number of received signal metrics can also be determined and combined to produce a combined received signal metrics.

A linear regression can be determined based on the received signal metrics, and is expressible in the form:

$$y = \alpha + \beta x \quad (1)$$

where α and β are regression parameters and are known as the intersection point and the slope factor respectively.

Alternatively, a multiple linear regression can be determined based on a number received signal metrics, and is expressible in the form:

$$y = \alpha + \beta_1 x_1 + \beta_2 x_2 + \ldots \beta_m x_m \quad (2)$$

It will be appreciated by those skilled in the art that the multiple linear regression is a line fitting represented by an intersection point and m number of slope factors, where m is the number of received signal metrics. Essentially, the multiple linear regression provides extra dimension(s) for selecting the transmit antennas, taking into account of other factors such as noise and interference.

Accordingly, the regression parameters can be determined, in step S1-2, as follows:

$$\beta = \frac{\sum_{i=1}^{n}(x_1 - \bar{x})(y_i - \bar{y})}{\sum_{i=1}^{n}(x_i - \bar{x})^2} \quad (3)$$

$$a = \bar{y} - \beta \bar{x} \quad (4)$$

where n is the total number of measurements, $x_i$ is the measured parameter, $y_i$ is the number of data subcarriers for the i th measurement, and $\bar{x}$ is the mean value of x.

Figure 7:
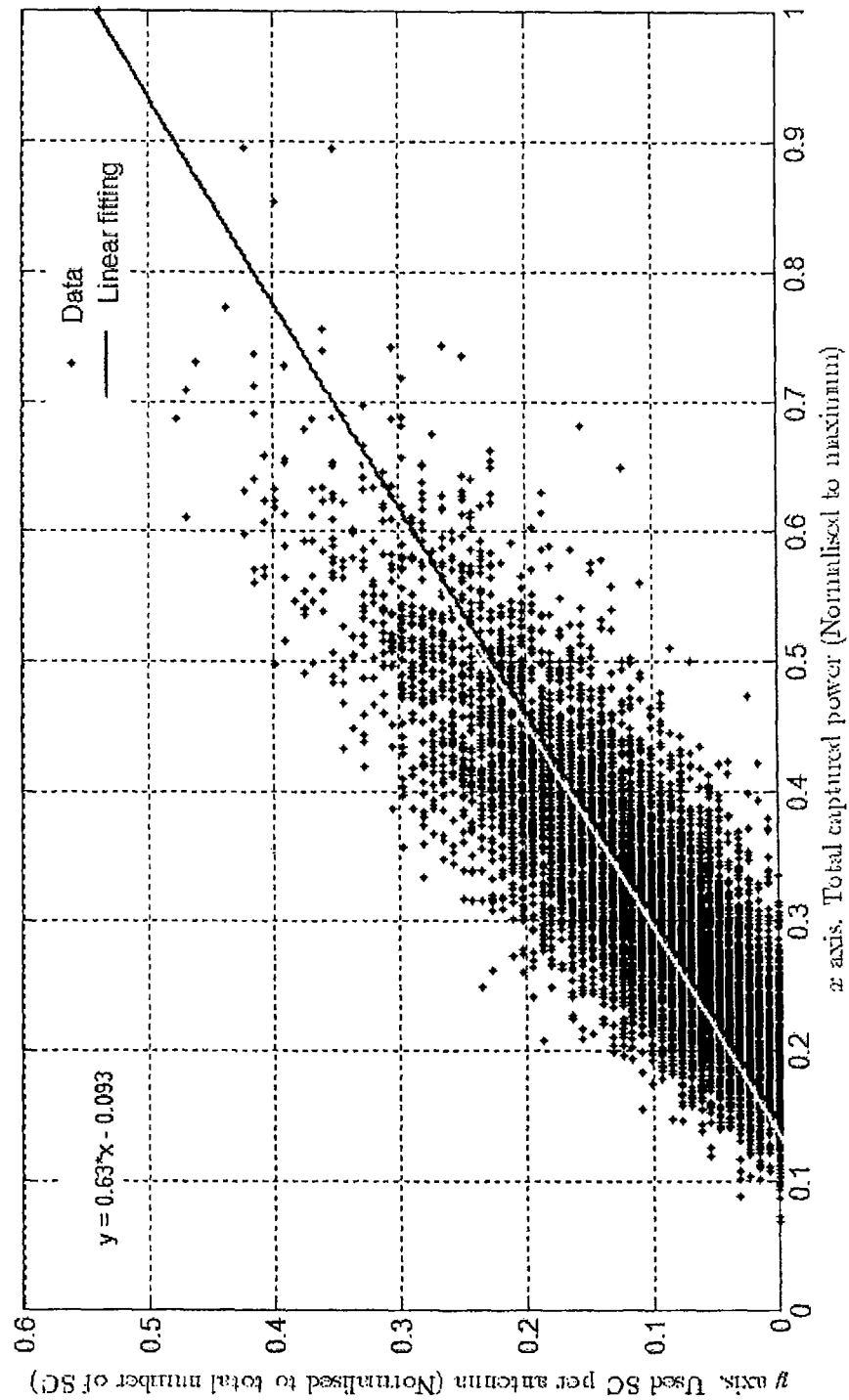
FIG. 7 is a graph illustrating an example of a linear regression.

Step S1-3: Generate a "linear fitting" (or commonly referred to as a linear regression) which will be used for estimating the number of data subcarriers that a given antenna can support. An example of the linear regression is illustrated in FIG. 7. The linear regression is generated using a least squares linear fit that minimises the square of the distance between every data point and a line that provides the best fit. Essentially, the overall solution minimises the sum of squared residuals, where the residual is the difference between an observed value and the value provided by the model. As shown in FIG. 7, the x-axis represents the normalised total received power, and the y-axis represents the number of subcarriers, normalised to the total number of subcarriers, that can be supported by each antenna. The linear regression can be generated prior to the device 20 being deployed. In such a case, the linear regression is generated based on statistics of previous received signals. Alternatively, the linear regression can be generated and updated continuously in "real-time", when the device is being deployed.

Step S1-4: Determine whether the linear regression has been generated for each of the antennas. If yes, perform step S1-5. Otherwise, perform step S1-4a and repeat steps S1-1 to S1-3.

Step S1-5: Reset the transmit antenna index, α=1.

Step S1-6: Determine the number of subcarriers that can be supported by transmit antenna, a, using the respective linear regression generated in step S1-3. To do this, signals received by each of the transmit antennas are compared with the linear regression to determine the number of subcarriers that can be supported by the transmit antenna. By way of an example, consider a situation in which there are 128 subcarriers to be supported and 4 transmit antennas are provided. The transmit antennas, TX 1 to TX 4, may be capable of supporting the required subcarriers in the following manner:

TX 1: 25 subcarriers
TX 2: 35 subcarriers
TX 3: 70 subcarriers
TX 4: 50 subcarriers In this case, the transceiver will therefore select antennas TX 3, TX 4, and TX 2 for transmission, as these antennas are able to support data transmission for a total of 155 subcarriers.

Step S1-7: Rank the transmit antennas. In this example, the transmit antennas are ranked in descending order by the number of subcarriers supported by each of the antennas. Following from the above example, the antennas can be ranked in the following order: TX 3, TX 4, TX 2 and TX 1. However, it will be appreciated that the transmit antennas can also be ranked in ascending order, and any other manner depending on the application.

Step S1-8: Alternatively, the transceiver can decide whether all the available antennas are to be utilised.

If yes, the following steps will be performed:

Step S1-9: α=α+1

Step S1-10: Determine whether all the transmit antennas have been allocated, α≤A, where A is the total number of available transmit antennas.

and repeat steps S1-6 to S1-7.

Otherwise, perform step S1-11 to determine whether all the subcarriers have been allocated.

Repeat steps S1-6 to S1-8 if there are more subcarriers to be allocated to the antennas. In this case, the transceiver will simply allocate the subcarriers to the transmit antennas until all the 128 subcarriers have been allocated. Following from the above example, although TX 4 is able to support 50 subcarriers, antennas TX 1, TX 2, and TX 3 will instead be selected for transmission as these antennas are able to support 130 subcarriers. Hence, the allocation of subcarriers (i.e. steps S1-6 to S1-8) will terminate at TX 3.

Step S-13: Select the antennas that have been allocated with subcarriers for transmission, and switch off the respective RF chains of the antennas that have not been allocated with any subcarriers. In another embodiment, instead of switching off the RF chains, the clock rate at which the unused RF chains operate can be reduced. In either case, the overall processing power of the transceiver can be reduced. It is further noted that the FFT modules and the A/D modules that are connected to the unused RF chains can also be powered off to further reduce power consumption.

Thus, the described embodiment provides the advantages of providing an early decision as to which antennas can be used for transmission and switching off unused RF chains, thereby reducing processing time and power.

It will be appreciated that the above described method can also be applied at a receiver to select antennas for reception.

While certain embodiments have been described, these embodiments have been presented by way of example only, and are not intended to limit the scope of the inventions. Indeed, the novel devices, methods, and products described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device comprising a plurality of antennas and operable to transmit data on a plurality of subcarriers from one or more of said plurality of antennas over a communication channel, the device comprising
    a receiver configured to receive analogue signals via each of said plurality of antennas;
    a processor configured to determine received signal metrics from the received analogue signals, and to further determine the number of subcarriers that can be allocated to one or more of said plurality of antennas for data transmission on the basis of the received signal metrics associated with said received signals; and
    an antenna selector configured to select one or more of said plurality of antennas for transmitting data on said plurality of subcarriers based on said determination;
    wherein the processor is further configured to perform said determination on the basis of a function defining a relationship between said received signal metrics and subcarriers that can be allocated to said one or more of said plurality of antennas, said function including a linear regression defining said relationship, and expressible in the form:

$$y=\alpha+\beta x$$

where "y" is the number of subcarrier and "x" is a measured parameter, and where α is the intersection point and β is the slope factor.

2. The device according to claim 1, wherein said received signal metrics include any one of the following:
    total received energy of said received signals;
    peak received power of said received signals; and
    root mean square (RMS) delay spread of said received signals.

3. The device according to claim 1, wherein said processor is further configured to arrange said plurality of antennas in descending order by the number of subcarriers that can be allocated to each of said plurality of antennas.

4. The device according to claim 3, wherein said antenna selector is configured to select a set of antennas from said arranged antennas, such that the total number subcarriers allocated to said set of antennas is equal to or greater than said plurality of subcarriers.

5. The device according to claim 4, further comprising radio frequency (RF) modules connected to each of said plurality of antennas, and said processor being operable to switch off said RF modules corresponding to antennas other than said selected antennas.

6. A method of operating a wireless communication device comprising a plurality of antennas and operable to transmit data on a plurality of subcarriers from one or more of said plurality of antennas over a communication channel, the method comprising:
receiving analogue signals via each of said plurality of antennas;
determining received signal metrics from the received analogue signals, and determining the number of subcarriers that can be allocated to one or more of said plurality of antennas for data transmission on the basis of received signal metrics associated with said received signals; and
selecting one or more of said plurality of antennas for transmitting data on said plurality of subcarriers based on said determination wherein said determining is performed on basis of a function defining a relationship between said received signal metrics and subcarriers that can be allocated to said one or more of said plurality of antennas, said function including a linear regression defining said relationship, and expressible in the form:

$$y = \alpha + \beta x$$

where "y" is the number of subcarrier and "x" is a measured parameter, and where $\alpha$ is the intersection point and $\beta$ is the slope factor.

7. The method according to claim 6, wherein said received signal metrics include any one of the following:
total received energy of said received signals;
peak received power of said received signals; and
root mean square (RMS) delay spread of said received signals.

8. The method according to claim 6, further comprising arranging said plurality of antennas in descending order by the number of subcarriers that can be allocated to each of said plurality of antennas.

9. The method according to claim 8, further comprising selecting a set of antennas from said arranged antennas, and wherein the total number subcarriers allocated to said set of antennas is equal to or greater than said plurality of subcarriers.

10. The method according to claim 9, wherein said wireless communication device further comprising radio frequency (RF) modules connected to each of said plurality of antennas, and the method further comprising switching off said RF modules corresponding to antennas other than said selected antennas.

11. A computer program product comprising computer executable instructions operable to configure a general purpose programmable communications device to perform a method according to claim 6.

* * * * *